United States Patent
Shi et al.

(10) Patent No.: US 9,794,403 B2
(45) Date of Patent: *Oct. 17, 2017

(54) SIMULTANEOUS LTE DATA AND DSDA VOICE

(71) Applicant: Apple Inc., Cupertino, CA (US)

(72) Inventors: Jianxiong Shi, Dublin, CA (US); Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,037

(22) Filed: Jul. 25, 2016

(65) Prior Publication Data
US 2016/0337515 A1 Nov. 17, 2016

Related U.S. Application Data

(63) Continuation of application No. 14/297,113, filed on Jun. 5, 2014, now Pat. No. 9,432,505.
(Continued)

(51) Int. Cl.
*H04M 3/42* (2006.01)
*H04M 3/428* (2006.01)
*H04W 76/02* (2009.01)
*H04W 4/16* (2009.01)
*H04W 52/02* (2009.01)
(Continued)

(52) U.S. Cl.
CPC .......... *H04M 3/4283* (2013.01); *H04W 4/16* (2013.01); *H04W 52/0229* (2013.01);
(Continued)

(58) Field of Classification Search
None
See application file for complete search history.

(56) References Cited

U.S. PATENT DOCUMENTS

| 6,009,325 A | 12/1999 | Retzer et al. |
| 2002/0198019 A1 | 12/2002 | Maim et al. |

(Continued)

FOREIGN PATENT DOCUMENTS

| JP | 2002529987 | 9/2002 |
| JP | 2008072488 | 3/2008 |

(Continued)

OTHER PUBLICATIONS

Office Action for Japanese Patent Application No. 2015-084485, Mar. 29, 2016, 6 pages.
(Continued)

*Primary Examiner* — German J Viana Di Prisco
(74) *Attorney, Agent, or Firm* — Meyertons Hood Kivlin Kowert & Goetzel, P.C.; Jeffrey C. Hood; Matthew C. Washburn

(57) ABSTRACT

Performing data communications by a Dual SIM Dual Active (DSDA) user equipment (UE), while simultaneously conducting two concurrent voice calls. The UE may receive a request to perform data communications while conducting a first voice call on a first radio and concurrently conducting a second voice call on a second radio. The UE may then determine whether one of the voice calls is currently on hold. The UE may perform the data communications using the radio on which the held call is being conducted. The UE may therefore dynamically select available slots from the first radio and the second radio for performing the data communication, based on which of the first radio and the second radio has a voice call that is currently on hold. In some embodiments, the data communications may be performed using a Long Term Evolution (LTE) protocol stack.

24 Claims, 8 Drawing Sheets

Related U.S. Application Data

(60) Provisional application No. 61/982,915, filed on Apr. 23, 2014.

(51) Int. Cl.
    *H04W 88/06* (2009.01)
    *H04W 8/18* (2009.01)
    *H04M 7/00* (2006.01)

(52) U.S. Cl.
    CPC ....... *H04W 76/025* (2013.01); *H04W 76/026* (2013.01); *H04M 7/0024* (2013.01); *H04M 2207/185* (2013.01); *H04W 8/183* (2013.01); *H04W 88/06* (2013.01); *Y02B 60/50* (2013.01)

(56) References Cited

U.S. PATENT DOCUMENTS

| | | |
|---|---|---|
| 2009/0181683 A1 | 7/2009 | Ryu |
| 2013/0012135 A1 | 1/2013 | Ruohonen et al. |
| 2014/0086152 A1 | 3/2014 | Bontu et al. |
| 2014/0213235 A1 | 7/2014 | Lou et al. |
| 2014/0273974 A1 | 9/2014 | Varghese et al. |
| 2014/0274006 A1 | 9/2014 | Mutya et al. |
| 2015/0023258 A1 | 1/2015 | Hu et al. |
| 2015/0141006 A1* | 5/2015 | Walke ............ H04W 8/18 455/434 |

FOREIGN PATENT DOCUMENTS

| | | |
|---|---|---|
| WO | 2000027154 | 5/2000 |
| WO | 2011109750 | 9/2011 |
| WO | 2013/007869 | 1/2013 |
| WO | 2013188545 | 12/2013 |

OTHER PUBLICATIONS

Office Action for Japanese Patent Application No. 2016-147721, May 25, 2017, 12 pages.

* cited by examiner

SIMULTANEOUS LTE DATA AND DSDA VOICE

PRIORITY INFORMATION

This application is a continuation of U.S. patent application Ser. No. 14/297,113, filed Jun. 5, 2014, by Jianxiong Shi an Li Su, entitled "Simultaneous LTE Data and DSDA Voice", which claims the benefit of U.S. Provisional Application No. 61/982,915 filed on Apr. 23, 2014, both of which are incorporated by reference herein in their entirety.

TECHNICAL FIELD

The present application relates to wireless devices, and more particularly to a system and method for enabling data communication simultaneously with multiple active voice calls in a wireless device.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication.

In particular, a user equipment (UE), e.g., a wireless device such as a cellular phone, may be capable of using multiple subscriber identity modules (SIMs). For example, a Dual SIM Dual Active (DSDA) UE is capable of using two SIMs and two radios, so as to maintain two active voice calls simultaneously. For example, a DSDA UE is capable of receiving a second voice call while conducting a first, and switching between the two voice calls without dropping either.

Due to baseband processing power limitation, existing DSDA UEs are limited to utilizing a first SIM that supports only GSM (Global System for Mobile Communications), and a second SIM that may support multiple radio access technologies (multi-RAT). For example, the multi-RAT SIM may support one or more of GSM, "1x" (Code Division Multiple Access 2000 (CDMA2000) 1x), 1xEV-DO (Evolution-Data Only), W-CDMA (Wideband Code Division Multiple Access), and LTE (Long Term Evolution). The GSM SIM uses a first radio, while the multi-RAT SIM uses a second radio, where the radio assignments are fixed.

For an existing DSDA UE, while two voice calls are active, data communications are limited. Specifically, the only present options for conducting data communications simultaneously with two active voice calls are GSM voice with GPRS (General Packet Radio Service) data, or W-CDMA voice with HSPA (High Speed Packet Access) data.

Therefore, it would be desirable to provide additional options for conducting data communications, using other RATs, while simultaneously conducting two active voice calls.

SUMMARY

Embodiments described herein relate to a user equipment (UE) and associated methods for performing data communications simultaneously with two active voice calls. The UE may include a first radio and a second radio, each for conducting voice calls, wherein the first and second radios may simultaneously operate to conduct voice calls. The UE may receive a request to perform a data communication while the first and second radios are performing the simultaneous voice calls. In response to the request, the UE may determine if one of the voice calls is currently on hold, and if so, use the radio conducting that "on hold" call to perform the data communication. After data communication has been performed, the UE may determine that the held voice call has been resumed, and that the other voice call has been placed on hold. The UE may then perform further data communication using the other radio, which is now conducting a held call.

In some embodiments, the data communication may be performed using a different radio access technology (RAT) protocol stack than that used to operate the held call. For example, the data communication may be performed using an LTE stack, even though the held call is being conducted using a different RAT, such as GSM or 1x. Where the UE is inserting data communication on each of the radios, the data communication may be performed using the same RAT protocol stack on each radio.

The UE may thus dynamically and opportunistically select available slots from the first radio and the second radio for performing the data communication, based on whether the first voice call or the second voice call is currently on hold. In some embodiments, a voice call that is currently on hold may be conducted using a discontinuous reception (DRX) mode and/or a discontinuous transmission (DTX) mode, wherein the DRX and DTX modes each have an on duration and an off duration. The UE may perform the data communication, using the same radio as the held call, during the off duration of the DRX and/or DTX mode. Where the UE determines that neither call is currently on hold, the UE may dynamically select available off duration slots from the first radio and the second radio for performing the data communication.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, figures, and claims.

BRIEF DESCRIPTION OF THE DRAWINGS

A better understanding of the present disclosure can be obtained when the following detailed description of the embodiments is considered in conjunction with the following drawings.

Figure 1:
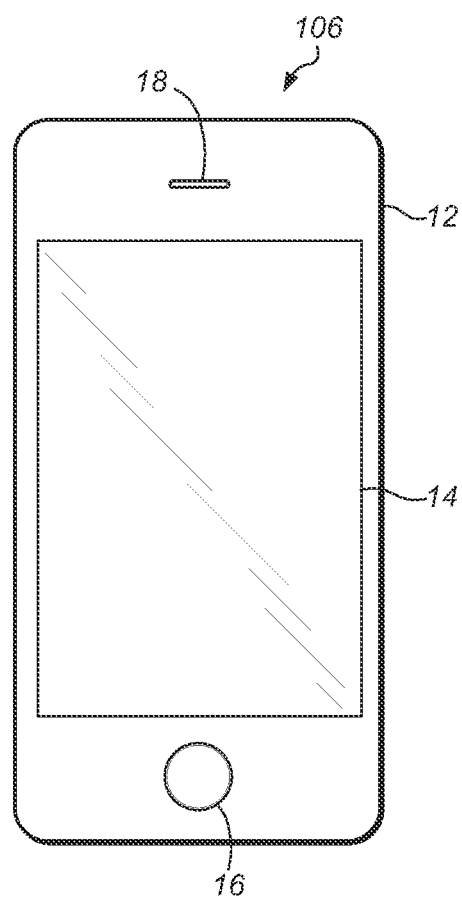
FIG. 1 illustrates an example user equipment (UE) according to one embodiment.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF THE EMBODIMENTS

Acronyms

The following acronyms are used in the present disclosure.
3GPP: Third Generation Partnership Project
3GPP2: Third Generation Partnership Project 2
CDMA: Code Division Multiple Access
CDRX: Connected Discontinuous Reception
DRX: Discontinuous Reception
DSDA: Dual SIM Dual Active
DTX: Discontinuous Transmission
GSM: Global System for Mobile Communications
LTE: Long Term Evolution
RAT: Radio Access Technology
RX: Receive
SIM: Subscriber Identity Module
TX: Transmit
UE: User Equipment
UMTS: Universal Mobile Telecommunications System Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced (LTE-A), and/or other RATs. For example, the UE 106 may support at least two radio access technologies such as LTE and GSM. Various different or other RATs may be supported as desired.

The UE 106 may comprise at least two antennas. The UE 106 may also comprise any of various radio configurations, such as various combinations of one or more transmitter chains (TX chains) and two or more receiver chains (RX chains). For example, the UE 106 may comprise two radios that may each support one or more RATs. The two radios may each comprise a single TX (transmit) chain and a single RX (receive) chain. Alternatively, the two radios may each comprise an RX chain and may share a single TX chain.

In the embodiment described herein, the UE 106 comprises two antennas, which communicate using two or more RATs. For example, the UE 106 may have a pair of cellular telephone antennas, where each antenna is coupled to a respective single radio. Where two radios share a single TX chain, the antennas may be coupled to the shared portions of the radios (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The second antenna may also be coupled to the first TX chain. The first and second receiver chains may be independent in frequency to allow for simultaneous voice calls on each of the two radios. The first and second receiver chains may additionally share a common local oscillator, which means that both of the first and second receiver chains are capable of tuning to the same frequency.

In some embodiments, each radio may time multiplex among two or more RATs, such as LTE and one or more other RATs such as GSM or CDMA1×. In the primary embodiment described herein the UE 106 comprises two radios, each comprising one transmitter chain and one receiver chain, wherein each radio may time multiplex between two (or more) RATs, such as LTE and GSM.

Each antenna may receive a wide range of frequencies such as from 600 MHz up to 3 GHz. Thus, for example, the local oscillator of one receiver chain may tune to a specific frequency such as an LTE frequency band. The wireless circuitry in the UE 106 can be configured in real time depending on the desired mode of operation for the UE 106. In the example embodiment described herein, the UE 106 is configured to support LTE, GSM, and 1× radio access technologies.

In some embodiments, the UE 106 comprises one or more subscriber identity modules (SIMs), which each support one or more RATs. For example, a first SIM may support one or more of GSM, "1×" (Code Division Multiple Access 2000 (CDMA2000) 1×), 1×EV-DO (Evolution-Data Only), W-CDMA (Wideband Code Division Multiple Access), and LTE (Long Term Evolution). In some embodiments, a second SIM may support only GSM. In other embodiments, the second SIM may support other additional RATs, such as LTE.

Figure 2:
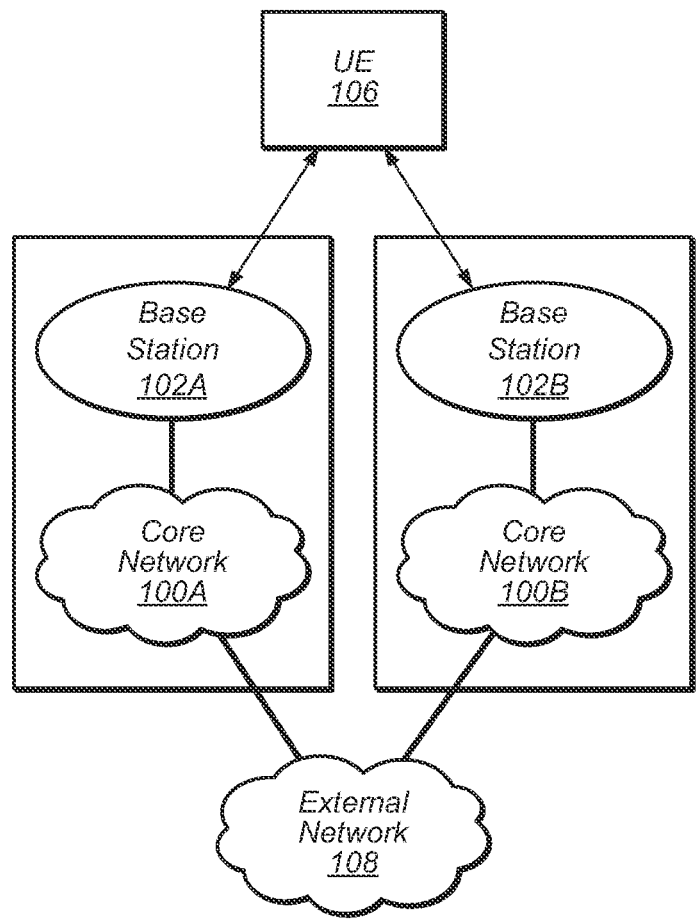
FIG. 2 illustrates an example wireless communication system where a UE communicates with two base stations.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various RATs (also referred to as wireless communication technologies or telecommunication standards), such as GSM, UMTS, LTE, LTE-A, CDMA2000 (e.g., 1×RTT, 1×EV-DO, HRPD, eHRPD), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two core networks may be controlled by the same network operator (e.g., cellular service provider or "carrier"), or by different network operators, as desired. In addition, the two core networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1×RTT, and/or any other combination of RATs) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1×RTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
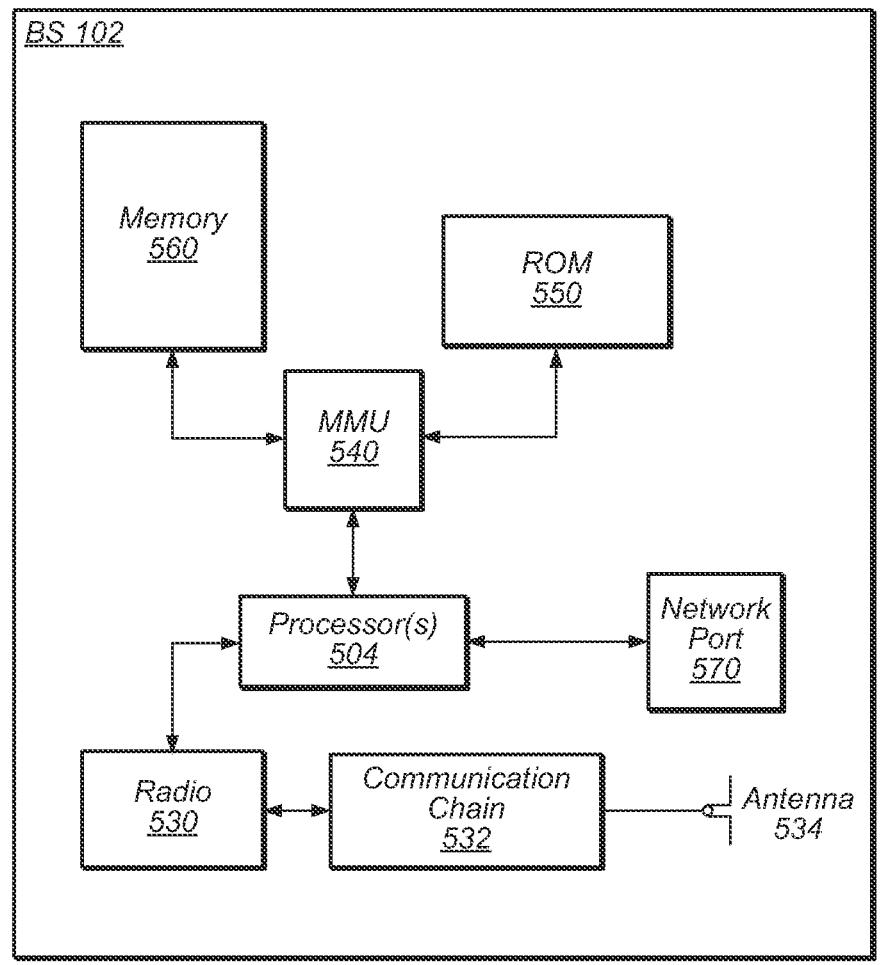
FIG. 3 is an example block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
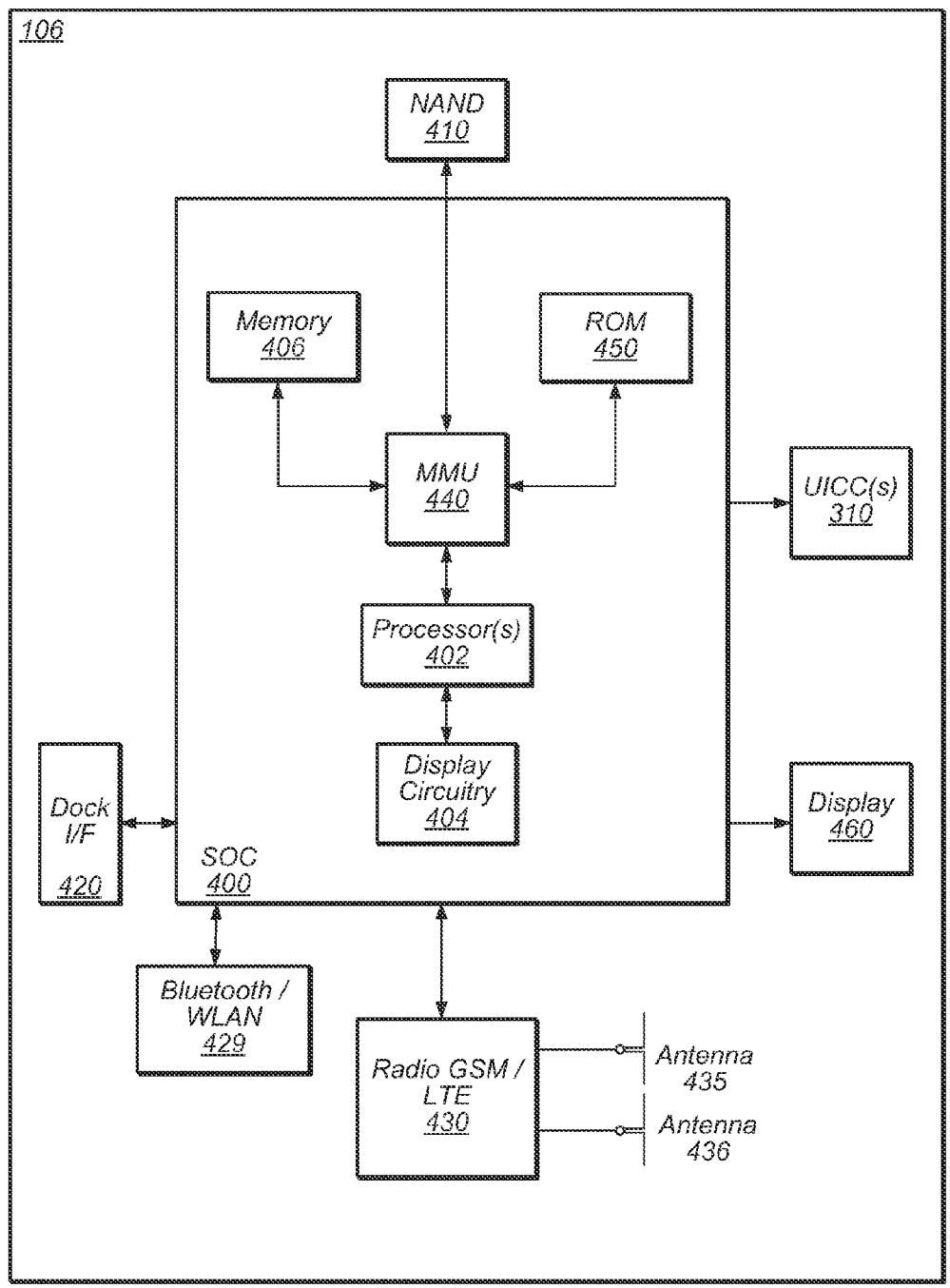
FIG. 4 is an example block diagram of a UE, according to one embodiment.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The UE 106 may further comprise one or more smart cards 310 that comprise SIM (Subscriber Identity Module) functionality, such as one or more UICC(s) (Universal Integrated Circuit Card(s)) 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality. In such an embodiment, a single one of the smart card(s) 310 may execute multiple SIM applications. Each of the smart card(s) 310 may include components such as a processor and a memory. Instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as LTE, and a second smart card 310 may comprise SIM functionality to support a second RAT such as GSM. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATs. In some embodiments, the cellular communication circuitry 430 may comprise two distinct radios, each having a receive chain and a transmit chain. In some embodiments, the two radios may support separate RAT stacks. Additionally, or alternatively, one or more of the RAT stacks may be capable of utilizing either radio.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
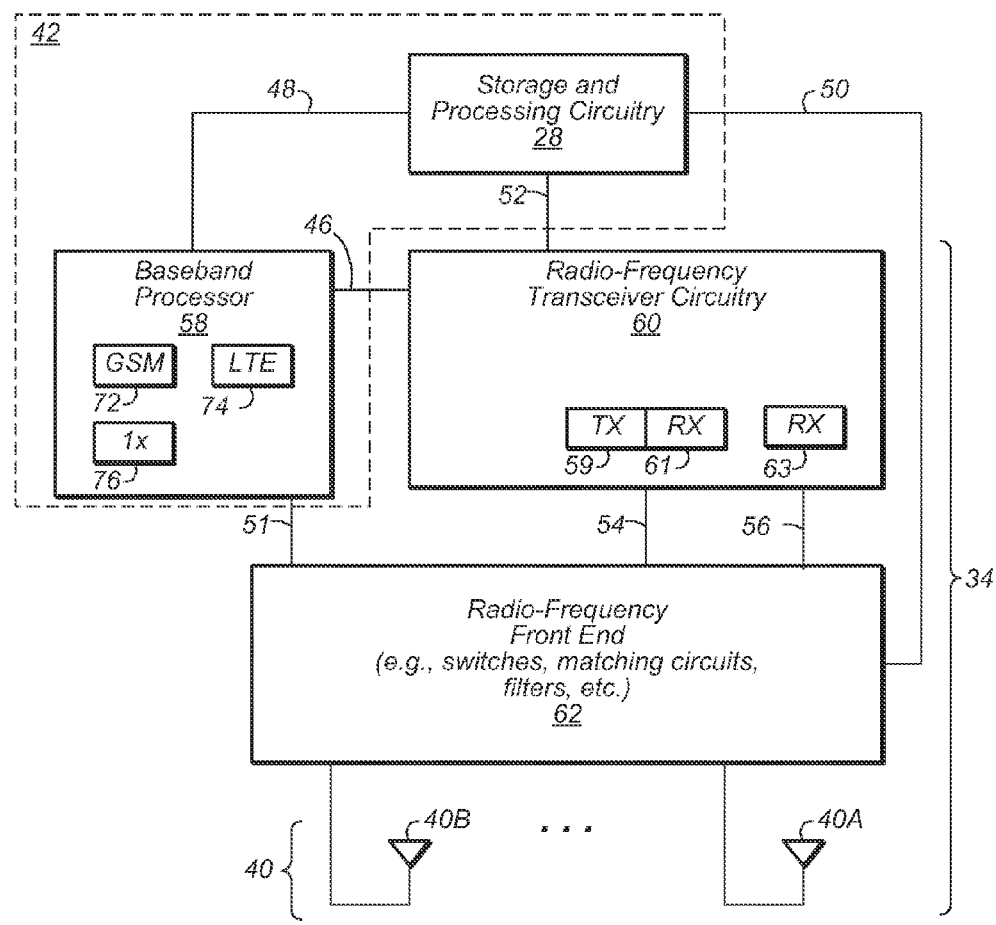
FIGS. 5A and 5B are example block diagrams of wireless communication circuitry in the UE, according to respective embodiments.
Figure 5B:
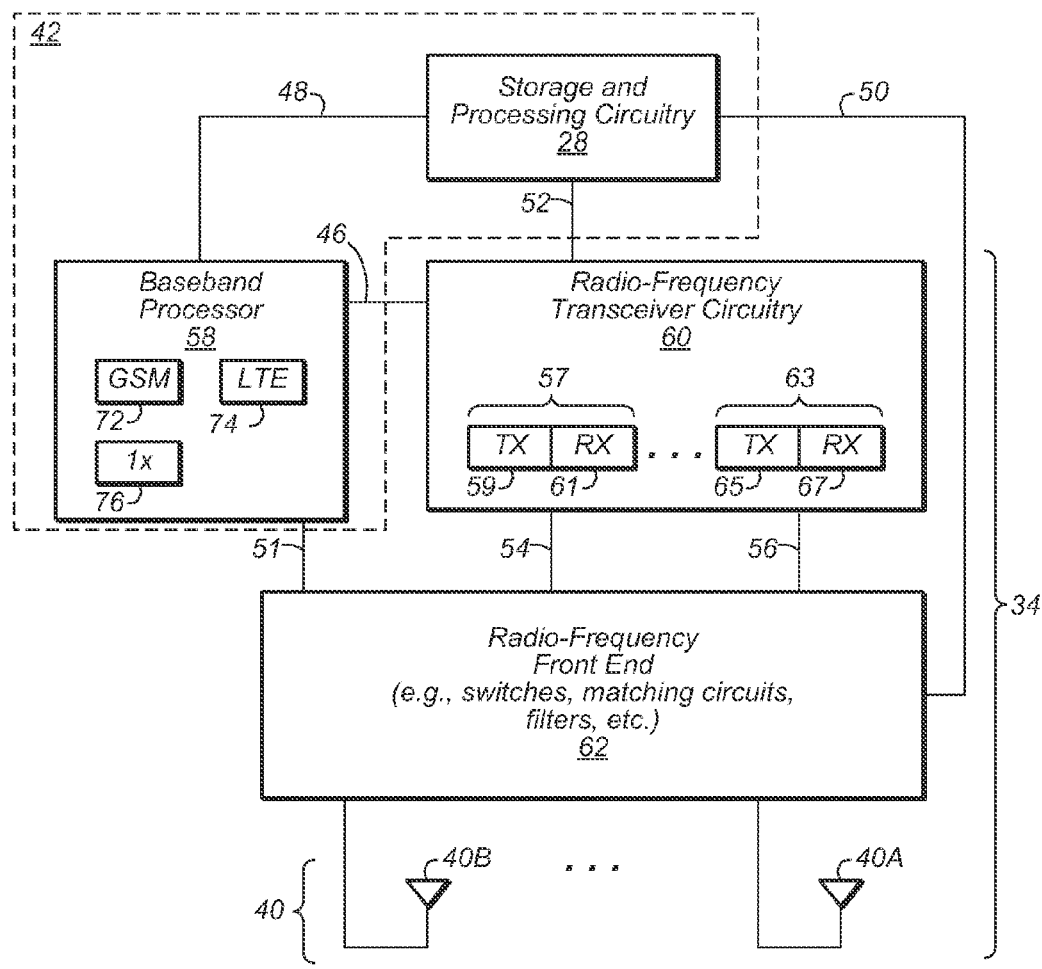

FIGS. 5A and 5B—UE Transmit/Receive Logic

FIG. 5A illustrates a portion of UE 106 according to one embodiment. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM protocol stack 72, LTE protocol stack 74, and 1× protocol stack 76, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or baseband processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. The embodiment shown may be considered to comprise two radios, which share a single TX chain. Other embodiments are of course contemplated.

As shown in FIG. 5B, the radio-frequency transceiver circuitry 60 may also comprise two or more TX chains and two or more RX chains. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, the second radio may be turned off to save power. Thus, the term "radio" may be defined to have the broadest scope of its ordinary and accepted meaning, and comprises the logic normally found in a radio, including one or more RX chains and either a single TX chain or a TX chain shared with another radio. Certain embodiments described herein may operate to improve performance when two radios operate concurrently.

Baseband processor 58 may receive digital data that is to be transmitted from storage and processing circuitry 28, and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

Control circuitry 42 may be used to execute software for handling more than one radio access technology. For example, baseband processor 58 may include memory and control circuitry for implementing multiple protocol stacks such as a GSM protocol stack 72, an LTE protocol stack 74, and a 1× protocol stack 76. Thus, protocol stack 72 may be associated with a first radio access technology such as GSM (as an example), protocol stack 74 may be associated with a second radio access technology such as LTE (as an example), and protocol stack 76 may be associated with a third radio access technology such as 1× (as an example). During operation, UE 106 may use GSM protocol stack 72 to handle GSM functions, LTE protocol stack 74 to handle LTE functions, and 1× protocol stack 76 to handle 1× functions.

The multiple protocol stacks may be supported by two or more SIMs (e.g., as executed by UICC(s) 310; not shown in FIGS. 5A-B), which may be implemented as multiple SIM cards, or as a single SIM card having multiple SIM applications. In other embodiments, the baseband processor 58 may comprise multiple baseband processors, each configured to implement a respective set of protocol stacks. For example, a first baseband processor may implement a GSM protocol stack, and a second baseband processor may implement 1× and LTE protocol stacks. In this embodiment, each of the first and second baseband processors may be supported by a respective SIM. For example, a first SIM, coupled to the first baseband processor, may provide SIM functionality supporting the GSM protocol stack, and a second SIM, coupled to the second baseband processor, may provide SIM functionality supporting the 1× and LTE protocol stacks.

Additional protocol stacks, additional transceivers, additional antennas 40, and other additional hardware and/or software may be used in UE 106 if desired. The arrangement of FIGS. 5A and 5B is merely illustrative. In one embodiment, one or more of the protocol stacks may be configured to implement the methods described in the flowcharts below.

The GSM and 1×RATs may generally be used to carry voice traffic, whereas the LTE RAT may generally be used to carry data traffic. To ensure that voice calls are not interrupted due to data traffic, GSM and 1× operations may take priority over LTE operations. To ensure that operations such as monitoring a GSM paging channel for incoming paging signals do not unnecessarily disrupt LTE operations, control circuitry 42 can, whenever possible, configure the wireless circuitry of UE 106 so that wireless resources are shared between LTE functions and GSM and 1× functions.

For example, when a user has an incoming GSM call, the GSM network may send UE 106 a paging signal (sometimes referred to as a page) on the GSM paging channel using base station 102. When UE 106 detects an incoming page, UE 106 can take suitable actions (e.g., call establishment procedures) to set up and receive the incoming GSM call. Pages are typically sent several times at fixed intervals by the network, so that devices such as UE 106 will have multiple opportunities to successfully receive a page.

Proper GSM page reception may require that the wireless circuitry of UE 106 be periodically tuned to the GSM paging channel, referred to as a tune-away operation. If the transceiver circuitry 60 fails to tune to the GSM paging channel or if the GSM protocol stack 72 in baseband processor 58 fails to monitor the paging channel for incoming pages, GSM pages will be missed. On the other hand, excessive monitoring of the GSM paging channel may have an adverse impact on an active LTE data session.

In some embodiments, in order for the UE 106 to conserve power, one or more of the protocol stacks 72-76 may support idle mode operations. Also, one or more of the protocol stacks 72-76 may support a discontinuous reception (DRX) mode and/or a connected discontinuous reception (CDRX) mode. DRX mode refers to a mode which does not use at least a portion of UE circuitry when there is no data (or voice) to be received, so as to conserve power. In DRX and CDRX modes, the UE 106 may synchronize with the base station 102 and wake up at specified times or intervals to listen to the network. Similarly, one or more of the protocol stacks 72-76 may support a discontinuous transmission (DTX) mode. DTX mode refers to a mode which does not use at least a portion of UE circuitry when there is no data (or voice) to be transmitted, so as to conserve power. For example, during a voice call, the UE may implement a DTX mode while the user is silent. DRX and DTX are present in several wireless standards such as UMTS, LTE (Long-term evolution), WiMAX, etc. The terms "idle mode", "DRX", "CDRX", and DTX are explicitly intended to at least include the full extent of their ordinary meaning, and are intended to encompass similar types of modes in future standards.

Figure 6:
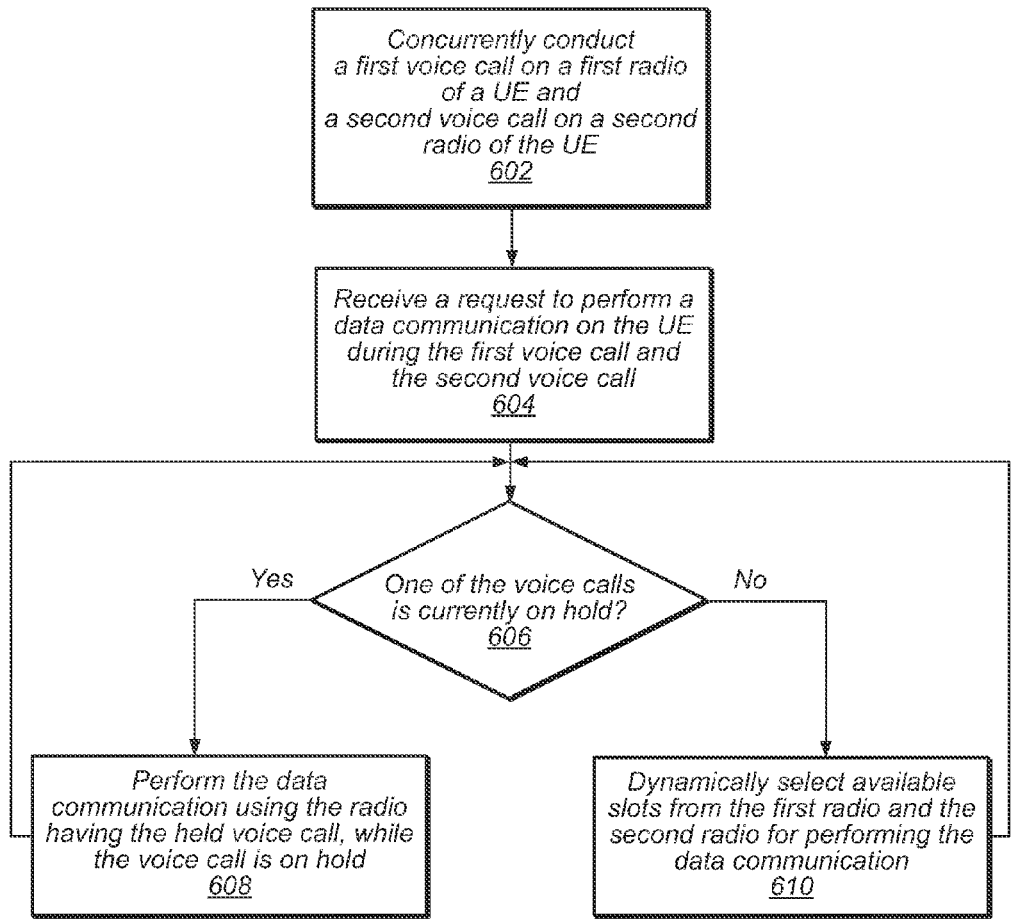
FIG. 6 is a flowchart diagram illustrating an exemplary method for performing simultaneous data and dual voice communications.

FIG. 6—Performing Simultaneous Data and Dual Voice Communications

FIG. 6 is a flowchart diagram illustrating a method for performing data transmission in a UE (such as UE 106) that comprises at least two radios. The method shown in FIG. 6 may be used in conjunction with any of the systems or devices shown in the above figures, among other devices. In various embodiments, some of the method elements shown may be performed concurrently, in a different order than shown, or may be omitted. Note also that additional method elements may also be performed as desired. The method may be performed as follows.

As shown, in 602, the UE 106 may concurrently conduct a first voice call on a first radio and a second voice call on a second radio. In other words, the first voice call and the second voice call may both be active. Here an "active call" refers to an ongoing call or a call that has been connected. An active call may be on hold, silent or fully active. During a call that is "on hold" the user may have manually selected an option to place the call on hold. During a call that is "silent" the call is not on hold, but the user is not actively participating on the call, i.e., is not fully active on the call. During a "fully active" call the user may be actively speaking or listening on the call.

In a typical scenario the user may be fully active on a first voice call and then a second voice call may be received to the UE 106. The user may choose to place the first call on hold and then answer the second call. Alternatively the user may go "silent" on the first call while answering the second call. When the first voice call is received on the UE 106 a first protocol stack may be executed to control the first radio to handle the first voice call. When the second call is received, a second protocol stack may be executed to handle the second voice call.

In some embodiments, the two voice calls may utilize different RATs. For example, the first voice call may be conducted using a GSM protocol stack, and the second voice call may be conducted using a 1× protocol stack. In other embodiments, the two voice calls may utilize the same RAT. For example, the first voice call may be conducted using a first GSM protocol stack, and the second voice call may be conducted using a second GSM protocol stack. In some embodiments, the UE may comprise two SIMs, each supporting one of the voice calls.

In 604, the UE 106 may receive a request to perform a data communication on the UE 106 while the first voice call and the second voice call are concurrently being performed. The data communication may comprise a data transmission and/or a data reception. For example, while the UE 106 is engaged in two active voice calls (e.g., one voice call may be fully active while the other call is on hold) the UE 106 may receive emails, or the user may choose to browse the Internet.

In 606, in response to the request, the UE 106 may determine whether one of the first or second voice calls is currently on hold. For example, the second voice call may be on hold while the first call is fully active. The UE 106 may determine that one of the voice calls is on hold by examining one or more call status bits. In 608, if one of the voice calls is determined to currently be on hold, the UE 106 may perform a portion or all of the data communication using the radio having the held voice call. For example, if the second voice call is determined to be on hold, the UE 106 may perform the data communication using the second radio while the second voice call is on hold. In order to perform the data communication on the second radio, the UE 106 may instantiate a third protocol stack for performing the data communication using the second radio. This third protocol stack may be executed in place of the second protocol stack that was previously handling the second voice call. For example, assume the UE 106 was executing a GSM protocol stack to handle the second voice call on the second radio, and the second voice call is on hold. When data communication is requested in 604 and the second voice call is determined to be on hold in 606, the UE 106 may begin execution of an LTE protocol stack to control the second radio instead of the GSM protocol stack. This "swapping" of protocol stacks may involve saving the state of the second protocol stack (in this example the GSM protocol stack) and swapping in the third protocol stack (in this example the LTE protocol stack) in its place to control the second radio to perform the data communications. The GSM protocol stack may be swapped back in to replace the LTE protocol stack when the second voice call needs to resume, e.g., to check on whether the second call is still on hold, or when the data communication completes.

In some embodiments, the protocol stack servicing the second voice call that is on hold may be operating in a DRX and/or DTX mode having an on duration and an off duration. During the on duration the second radio is sending or receiving information for the second voice call (e.g. silent voice frame or signaling control messages), and during the off duration the second radio is not sending or receiving information for the second voice call. The second voice call is still considered to be an active voice call, i.e., to be conducted concurrently with the first voice call, even while in the off duration of DRX or DTX mode. In some embodiments, the UE may perform the data communication on a radio of a held voice call while the held voice call is in an off duration of a DRX or DTX mode.

Therefore, the data communication may be performed using a different RAT than the voice calls. For example, as noted above, the data communication may be performed using an LTE protocol stack. In some embodiments, the UE 106 may switch out the protocol stack supporting the held voice call (e.g. the GSM or 1× stack) with the protocol stack supporting the data communication (e.g. the LTE stack), such that the protocol stack supporting the data communication (e.g. the LTE stack) is operating the radio on which the held voice call is being conducted. The UE may automatically switch back to the protocol stack supporting the held voice call (e.g. the 1× stack), e.g. temporarily, as necessary to support a silent voice frame, signaling control messages, etc.

After a portion or all of the data communication has been performed, the UE 106 may return to 606. In some embodiments, the UE 106 may return to 606 after a specified period of time, e.g., at the end of the off duration of a DRX mode of the held voice call, or after communicating a specified amount of data. In other embodiments, the UE 106 may return to 606 in response to determining that the voice call previously determined to be on hold is no longer on hold. For example, if the data communication is being performed on the second radio while the second voice call is on hold, the UE 106 may return to 606 in response to determining that the second voice call is no longer on hold.

In 606, the UE 106 may again determine whether one of the first or second voice calls is currently on hold. If the same voice call is determined to be on hold, the data communication may continue on the same radio. If, instead, the other voice call is determined to be on hold, a next portion of the data communication may be performed on the other radio.

For example, in one possible scenario, the UE 106 may perform a first portion of the data communication on the second radio, e.g., using an LTE protocol stack, while the second voice call is on hold, e.g., using a 1× protocol stack. The UE may then determine that the second voice call is no longer on hold, and return to 606. In 606, the UE 106 may determine that the first voice call is currently on hold, e.g., using a GSM protocol stack. In 608, the UE 106 may then perform a second portion of the data communication on the first radio while the first voice call is on hold. In some embodiments, the UE 106 may perform the second portion of the data communication on the first radio using the same protocol stack (e.g., the same LTE protocol stack) that was used to perform the first portion of the data communication on the second radio.

In this manner, the UE 106 may dynamically and opportunistically select available time slots from either or both of the first radio and/or the second radio for performing the data communication, based on which of the first radio and the second radio has a voice call that is currently on hold. For example, the UE may search for available transmit time slots on the TX chain of the radio that has a voice call that is currently on hold and/or search for available receive time slots on the RX chain of the radio that has a voice call that is currently on hold. Therefore, assume there are two active voice calls on the UE 106 and the user is switching back and forth between the two calls, alternating between the first call being fully active on the first radio with the second call being on hold on the second radio, followed by the first call being on hold on the first radio and the second call being fully active on the second radio, etc. Assume the user then begins conducting a browsing session on the UE 106. The data packets in the browsing session may alternate from being transmitted and/or received on the first radio and the second radio, depending on which radio is on hold. Thus the data packets in the browsing session may essentially "ping pong" back and forth between the first radio and the second radio, depending on which radio is on hold.

In 610, if the UE 106 determines that neither of the first and second voice calls is on hold, i.e., both of the calls are either silent or fully active, the UE 106 may dynamically select available slots from the first radio and the second radio for performing the data communication. For example, the UE 106 may search for available transmit time slots on the TX chain of each of the first and second radios, and/or search for available receive time slots on the RX chain of each of the first and second radios. In particular, the UE 106 may search for available off duration slots in DRX and/or DTX cycles on each of the first and second radios, and dynamically and opportunistically use these slots for the data communication. Thus the data communication may "ping pong" back and forth between the first radio and the second radio, depending on which radio has available off duration slots. In such a scenario, the user may talk and/or listen on both fully active (or silent) voice calls simultaneously, while also performing data communications on either or both of the radios.

Figure 7:
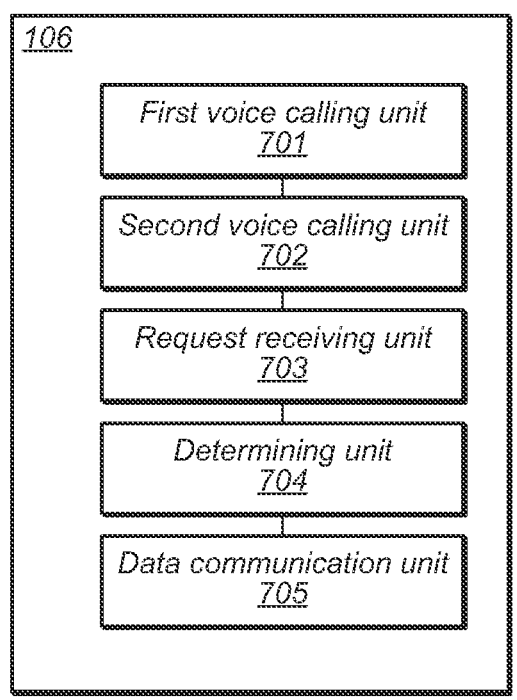
FIG. 7 is an example block diagram of a UE, according to one embodiment.

FIG. 7 is an example block diagram of a UE, such as UE 106, according to one embodiment. The UE 106 is configured to perform data transmission and comprises: a first radio, a second radio, a first voice calling unit 701 configured to conduct a first voice call via the first radio; a second voice calling unit 702 configured to conduct a second voice call via the second radio, wherein the conducting the second voice call is performed concurrently with the conducting the first voice call; a request receiving unit 703 configured to receive a request to perform a data communication during the conducting the first voice call and the second voice call; a determining unit 704 configured to determine if one of the first or second voice calls is currently on hold after the receiving the request to perform the data communication; and a data communication unit 705 configured to perform, if one of the first or second voice calls is determined to be on hold, the data communication via the radio through which the determined voice call is being conducted, while the determined voice call is on hold.

The UE may further comprise a slot selecting unit configured to dynamically select available slots from the first radio and the second radio for performing the data communication, based on whether the first voice call or the second voice call is currently on hold.

The UE may further comprise a second determining unit configured to determine, after the performing the data communication via the radio through which the determined voice call is being conducted, determine that the determined voice call is no longer on hold; and a third determining unit configured to determine that the other one of the first or second voice calls is currently on hold. In these embodiments, the data communication unit is further configured to perform further data communication via the radio through which the other one of the first or second voice calls is being conducted. It should be noted that all the features as discussed above apply to the UE as described with reference to FIG. 7.

In some embodiments, one or more of the units included in the UE, as described above, may be implemented by the processor(s) 402 of FIG. 4. In other embodiments, one or more of the units may be discrete components. Some or all of the units included in the UE may be implemented as ASICs, FPGAs, or any other suitable hardware components or modules.

Embodiments described in this disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE) configured to perform data transmission, comprising:
   a first radio;
   a second radio;
   one or more processors coupled to the first radio and the second radio, wherein the one or more processors are configured to:
      concurrently conduct a first voice call via the first radio and a second voice call via the second radio, wherein the first voice call is supported by a first subscriber identity module (SIM), and the second voice call is supported by a second SIM;
      receive a request to perform a data communication during the conducting the first voice call and the second voice call;

determine whether one of the first voice call or the second voice call is currently on hold after the receiving the request to perform the data communication;

in response to determining that the first voice call is on hold, perform the data communication via the first radio while the first voice call is on hold; and in response to determining that the second voice call is on hold, perform the data communication via the second radio while the second voice call is on hold;

wherein the data communication is supported by one of the first SIM and the second SIM.

2. The UE of claim 1, further comprising:

the first SIM configured to support the first voice call; and
the second SIM configured to support the second voice call.

3. The UE of claim 1, wherein the one or more processors are further configured to implement:

a first radio access technology (RAT) stack configured to conduct the first voice call;

a second RAT stack configured to conduct the second voice call; and a third RAT stack configured to perform the data communication.

4. The UE of claim 3, wherein at least one of the first RAT stack and the second RAT stack is one of a GSM stack and a 1× stack;

wherein the third RAT stack is an LTE stack.

5. The UE of claim 1, wherein the one or more processors are further configured to:

dynamically select available slots from the first radio and the second radio for performing the data communication, based on whether the first voice call or the second voice call is currently on hold.

6. The UE of claim 1, wherein the one or more processors are further configured to:

after performing the data communication via the radio through which the held voice call is being conducted, determine that the held voice call has been resumed, and that the other voice call is on hold; and perform further data communication via the radio through which the other voice call is being conducted.

7. The UE of claim 1, wherein the held voice call is conducted using a discontinuous reception (DRX) mode, wherein the DRX mode has an on duration and an off duration;

wherein the performing the data communication on the radio through which the held voice call is being conducted comprises performing the data communication during the off duration of the DRX mode.

8. A method for performing data transmission in a user equipment device (UE), wherein the UE comprises at least two subscriber identity modules (SIMs) and at least two radios, the method comprising:

concurrently conducting a first voice call on a first radio of the UE and a second voice call on a second radio of the UE;

performing a first data communication on the first radio while the first voice call is on hold and the second voice call is not on hold;

after performing the first data communication, performing a second data communication on the second radio while the second voice call is on hold and the first voice call is not on hold;

receiving a request to perform a third data communication during the concurrently conducting the first voice call and the second voice call, while neither the first voice call nor the second voice call is currently on hold; and in response to the request, dynamically selecting available slots from the first radio and the second radio for performing the third data communication, while neither the first voice call nor the second voice call is currently on hold.

9. The method of claim 8, wherein the first radio conducts the first voice call using a first radio access technology (RAT); and wherein the first data communication is performed using a second, different RAT.

10. The method of claim 9, wherein the first RAT is one of GSM (Global System for Mobile Communications) or 1× (Code Division Multiple Access 2000 (CDMA2000) 1×RTT); and wherein the second RAT is LTE (Long Term Evolution).

11. The method of claim 9, wherein the second radio conducts the second voice call using a third RAT, different from the second RAT; and wherein the second data communication is performed using the second RAT.

12. The method of claim 8, further comprising:

dynamically selecting available slots from the first radio and the second radio for performing the data communication, based on which of the first radio and the second radio has a voice call that is currently on hold.

13. The method of claim 12, wherein the first radio comprises a first transmit/receive chain;

wherein the second radio comprises a second transmit/receive chain;

wherein the data communication comprises a data transmission by the UE;

wherein the dynamically selecting available slots comprises searching for available transmit time slots on the transmit chain of the radio that has a voice call that is currently on hold.

14. The method of claim 12, wherein the first radio comprises a first transmit/receive chain;

wherein the second radio comprises a second transmit/receive chain;

wherein the data communication comprises a data reception by the UE;

wherein the dynamically selecting available slots comprises searching for available receive time slots on the receive chain of the radio that has a voice call that is currently on hold.

15. The method of claim 8, wherein the first radio conducts the first voice call using a discontinuous reception (DRX) mode, wherein the DRX mode has an on duration and an off duration;

wherein the first data communication is performed during the off duration of the DRX mode.

16. The method of claim 8, wherein the first radio comprises a first transmit/receive chain;

wherein the second radio comprises a second transmit/receive chain;

wherein the third data communication comprises a data transmission by the UE;

wherein the dynamically selecting available slots comprises dynamically searching for available transmit time slots on the transmit chains of each of the first and second radios.

17. The method of claim 8,
wherein the first radio comprises a first transmit/receive chain;
wherein the second radio comprises a second transmit/receive chain;
wherein the third data communication comprises a data reception by the UE;
wherein the dynamically selecting available slots comprises dynamically searching for available receive time slots on the receive chains of each of the first and second radios.

18. A user equipment device (UE) configured to perform data transmission, comprising:
a first radio;
a second radio;
one or more processors coupled to the first radio and the second radio, wherein the one or more processors are configured to:
concurrently conduct a first voice call via the first radio and a second voice call via the second radio;
perform a first data communication via the first radio while the first voice call is on hold and the second voice call is not on hold;
perform a second, subsequent data communication via the second radio while the second voice call is on hold and the first voice call is not on hold;
receive a request to perform a third data communication during the concurrently conducting the first voice call and the second voice call, while neither the first voice call nor the second voice call is currently on hold; and
in response to the request, dynamically select available slots from the first radio and the second radio for performing the third data communication, while neither the first voice call nor the second voice call is currently on hold.

19. The UE of claim 18, wherein the first data communication and the second data communication are performed using a first radio access technology (RAT), and the first voice call and the second voice call are not performed using the first RAT.

20. A user equipment device (UE) configured to perform data transmission, comprising:
one or more processors configured to:
concurrently conduct a first voice call via a first radio and a second voice call via a second radio, wherein the first voice call is supported by a first subscriber identity module (SIM), and the second voice call is supported by a second SIM;
receive a request to perform a data communication during the conducting the first voice call and the second voice call;
determine whether one of the first voice call or the second voice call is currently on hold after the receiving the request to perform the data communication;
in response to determining that the first voice call is on hold, perform the data communication via the first radio while the first voice call is on hold; and
in response to determining that the second voice call is on hold, perform the data communication via the second radio while the second voice call is on hold;
wherein the data communication is supported by one of the first SIM and the second SIM.

21. The UE of claim 20, wherein the one or more processors are further configured to implement:
a first radio access technology (RAT) stack configured to conduct the first voice call;
a second RAT stack configured to conduct the second voice call; and
a third RAT stack configured to perform the data communication.

22. The UE of claim 20, wherein the one or more processors are further configured to:
dynamically select available slots from the first radio and the second radio for performing the data communication, based on whether the first voice call or the second voice call is currently on hold.

23. A user equipment device (UE) configured to perform data transmission, comprising:
one or more processors configured to:
concurrently conduct a first voice call via a first radio and a second voice call via a second radio;
perform a first data communication via the first radio while the first voice call is on hold and the second voice call is not on hold;
perform a second, subsequent data communication via the second radio while the second voice call is on hold and the first voice call is not on hold;
receive a request to perform a third data communication during the concurrently conducting the first voice call and the second voice call, while neither the first voice call nor the second voice call is currently on hold; and
in response to the request, dynamically select available slots from the first radio and the second radio for performing the third data communication, while neither the first voice call nor the second voice call is currently on hold.

24. The UE of claim 23, wherein the first data communication and the second data communication are performed using a first radio access technology (RAT), and the first voice call and the second voice call are not performed using the first RAT.

* * * * *